Patented Oct. 18, 1949

2,485,260

UNITED STATES PATENT OFFICE 2,485,260

HYDROCARBON CONVERSION IN PRESENCE OF SILICA-MAGNESIA CATALYST

Gerald C. Connolly, Elizabeth, N. J., assignor to Standard Oil Development Company, a corporation of Delaware No Drawing. Application November 17, 1944, Serial No. 563,973

6 Claims. (Cl. 196—52)

This invention relates to catalysts for the conversion of hydrocarbon oils and pertains more particularly to a catalyst for cracking hydrocarbon oils and to methods of preparing the same.

This application forms a continuation-in-part of my earlier application Serial No. 311,087, filed December 27, 1939.

It has heretofore been proposed to crack hydrocarbon oil by passing the same, preferably in vapor form, in contact with adsorbent masses, usually containing silica and alumina, such as naturally active or activated clays, synthetic silica-alumina gels and alumina impregnated silica gels.

One of the primary objects of the present invention is to provide an improved catalyst for the conversion of hydrocarbon oils.

A further object of the invention is to provide an improved catalyst for the conversion of hydrocarbon oils which will give a high ratio of motor fuel to low-grade products such as coke and gas.

Other objects and advantages of the invention will be apparent from the more detailed description hereinafter.

It has been found, as a result of extensive experimentation involving the preparation and testing of a large number of different types of catalysts, that synthetic adsorbent gel material containing silica and magnesia particularly when prepared as hereinafter described is not only a highly active catalyst for cracking of hydrocarbon oils but also produces a high ratio of motor fuels to rejected gas and other low-grade products. Expressed in another way, the improved catalyst results in less degradation of oil into fixed gases during the production of a given percentage of gasoline.

For example, to form a catalyst having a desired level of efficiency it is important to combine the magnesium either in the form of the oxide or a compound convertible to the oxide with the silica while the latter is in a hydrous state such as in the form of a hydrosol, hydrogel, wet gelatinous precipitate or a mixture thereof.

When compounds other than oxides and hydroxides are used as a source for the magnesia such as magnesium salts, the salts should be of relatively weak acids such as carbonic acids. Salts of the strong acids such as magnesium nitrate, chloride, and sulphates have not proven highly satisfactory.

One particularly effective method of preparing the catalyst is to intimately mix magnesium oxide, hydroxide, carbonate or bicarbonate in finely divided form with a hydrous oxide of silica such as silica hydrogel or a gelatinous precipitate of silica in such proportions that the magnesia content of the final dried products contains from 20 to 60% of magnesia and preferably between 20 and 50%. Maximum yields of gasoline with minimum formation of gas are obtained when the catalyst contains about 30% by weight of magnesia.

In order to produce a catalyst having an exceptionally high order of activity it is also desirable to control the preparation of the silica hydrogel in such manner that a sample of dried gel formed therefrom has an apparent density between about .40 and .75 and particularly between .60 and .70. The term "apparent density" of the gel means the weight in grams of a cubic centimeter of 4 to 12 mesh granules of the gel.

The apparent density of the gel product can be modified during preparation by various methods such as by the length and temperature of the washing treatment, leaching the hydrogel with basic solution preferably ammonia hydroxide solution and by other means known to those familiar in the art.

The term silica hydrogel has reference to the intermediate product formed in the preparation of silica gel and its method of preparation need not be described in detail. Briefly, the product is formed by hydrolyzing the basic solution of alkaline silicate, generally sodium silicate, with an acid under conditions such that the resulting solution is slightly acid. Under properly controlled conditions a substantially clear solution or hydrosol is formed which more or less gradually coagulates into a firm jelly in the course of from 2 to 6 hours.

By suitable adjustments of conditions instead of the hydrosol an immediate flocculent gelatinous precipitate may form directly. By regulating these conditions, products ranging from a more or less non-gelatinous precipitate to a true hydrogel may be obtained. All of such products or mixtures thereof may be employed to advantage as one component in preparation of the catalyst forming the present invention. It is preferred, however, to control the preparation so as to form a true hydrosol which gradually coagulates into a jelly after standing for a substantial period.

The hydrogel or gelatinous precipitate, formed as heretofore described, is preferably broken into lumps and washed free of soluble salts. As already mentioned, the density of the final gel can be controlled within limits by regulating the amount of washing and the temperature of the wash water.

According to the present invention, the silica hydrogel or gelatinous precipitate or mixtures thereof, with or without previous washing, is intimately mixed with magnesia or with a magnesium salt capable of being converted to the oxide, such as magnesium hydroxide, carbonate, bicarbonate or the like, in such proportions that the resulting products contain from 20 to 60% of magnesia. The mixing of the two components can be accomplished in any desired manner, such as in a ball mill or other types of kneading mills.

Any commercial grade of magnesia or magnesium compounds heretofore referred to can be employed in the present invention. The presence of a small amount of calcium oxide normally present in such commercial grades is not harmful. In cases where the catalyst is regenerated with an oxidizing gas the catalyst should be substantially free of alkali metal compounds. The commercial grade magnesia may comprise, for example, calcined magnesia formed by calcining precipitated carbonates or it may comprise calcined magnesite.

After the two components are intimately mixed, the product is slowly dried at a temperature below about 200 to 250° F. until the major portion of the water contained in the hydrogel has been evaporated. Afterwards the products may be further dried and activated by slowly heating to a temperature up to from 800° to 1400° F. and maintaining it at such temperature for a period of from 3 to 4 hours. For best results the activating temperature should be between about 1200° and 1300° F.

The resulting product may be used either in powdered, granular or molded state. In case the product is molded, such as by extrusion, the mixture may be thoroughly kneaded and extruded before drying, or the product may be dried or partially dried and then extruded.

It has been found that catalysts prepared as above described are not only extremely active for cracking oil but also produce an exceptionally high ratio of motor fuel to low-grade products, such as coke and gas.

For a fuller understanding of the invention the following examples may be helpful, it being understood that the values and conditions given therein are illustrative rather than limitive.

In each of the examples given the cracking activity of the catalyst was determined by measuring the per cent of 400° F. end point gasoline obtained by passing East Texas gas oil of 33.8 A. P. I. gravity in contact with a molded catalyst at a temperature of 850° F. for a two-hour period, the rate of flow of the oil being .6 volume liquid per volume of catalyst per hour and the length of the cracking period being 2 hours. The number of liters of gas liberated for each 100 grams of liquid products formed is taken as a measure of the gas forming tendency of the catalyst. Also, the density of the rejected gas as compared with air is taken as an indication of the nature of the gas so liberated.

Example 1

A dry silica gel having an apparent density of .403 was impregnated with magnesium nitrate solution of a concentration capable of producing a final product containing about 10% magnesium oxide. This product after thorough soaking was drained, dried and activated at 850° F. When tested under the conditions outlined above, 16% of liquid distillate boiling below 400° F. was obtained. In addition 4 liters of .58 density gas was formed for each 100 grams of liquid product recovered.

Example 2

A second sample of catalyst was prepared in the same manner as described in Example 1 except that the silica gel had an apparent density of .600 rather than .403. This catalyst when tested under the above conditions resulted in a 9% yield of distillate boiling below 400° F. and liberated 1.4 liters of .9 density gas per 100 grams of liquid products recovered.

Example 3

A sample of dry silica gel having an apparent density of .70 when tested under the above conditions resulted in a yield of about 12% of liquid distillate and a sample of pure magnesium oxide when tested under the above conditions resulted in about 4% conversion into 400 end point gasoline. It will be noted from these tests that neither the silica gel nor magnesium oxide when separately used has any substantial activity for cracking hydrocarbon oil.

Example 4

A batch of catalyst was prepared by intimately mixing silica hydrogel, a dried sample of which had an apparent density of .430, with a commercial grade of magnesium oxide in such proportions that the resulting dried product had about 30% of magnesium calculated on the dry basis and the dried product activated at 1250° F. The resulting products when tested as hereinbefore described produced 33.0% of 400 end point distillate and liberated 5.3 liters of .79 density gas for each 100 grams of liquid product recovered.

Example 5

Another batch of catalyst was prepared as in Example 4 except that the silica hydrogel employed was such that a sample of dry gel obtained therefrom had an apparent density of .60. This product when activated at 1250° F. resulted in about 44% conversion into 400° F. end point distillate and liberated about 7.5 liters of .86 density gas.

Example 6

A series of catalysts was prepared as described in Examples 3 and 4 except that the hydrogel was such that a sample of dry gel obtained therefrom had an apparent density of .700. The amount of magnesia combined with the gel was varied in the different batches to produce final catalysts having 10%, 20%, 30%, 40%, 50% and 60% magnesium oxide. These products were tested as above described and resulted in 15.5%, 39.0%, 53.0%, 51.0%, 41.0% and 30% of 400 end point distillate, respectively. The number of liters of gas liberated for each 100 grams of liquid product obtained from these different batches of gels was 2.7, 4.2, 7.2, 11.2, 6.4 and 4.0, respectively.

The effect of the percentage of magnesium oxide in the catalyst as determined in Examples 3 and 6 in which the dry silica gel had an apparent density of .70 is shown in the following table:

| Catalyst Composition | 400° F. E. P. Gasoline | Gas L/100 Grams Liquid Product | Gas Density |
| --- | --- | --- | --- |
| | Per cent | | |
| 100% silica | 12 | 5.2 | .59 |
| 10% MgO balance SiO₂ | 15.5 | 2.7 | .74 |
| 20% MgO balance SiO₂ | 39.0 | 4.2 | .84 |
| 30% MgO balance SiO₂ | 53.0 | 7.0 | .87 |
| 40% MgO balance SiO₂ | 51.0 | 11.2 | .68 |
| 50% MgO balance SiO₂ | 41.0 | 6.4 | .78 |
| 60% MgO balance SiO₂ | 30 | 4.0 | .76 |
| 100% MgO balance SiO₂ | 4.0 | 1.0 | .87 |

From the above table it will be seen that for maximum gasoline yield coupled with a high ratio of gasoline to gas formed, the catalyst should contain approximately 30% magnesium oxide but catalysts containing from 20% to 60% give a good yield of gasoline and relatively small amount of rejected gas.

The effect of the apparent density of the silica gel base and the activity of the catalyst as determined in Examples 4, 5 and 6 in which 30% magnesia was employed is more clearly summarized in the following table:

| Catalyst Composition | App. D. of Si Gel | 400° F. E. P. Gasoline | Gas L/100 Grams Liquid Product | Gas |
|---|---|---|---|---|
| | | Per cent | | |
| 30% MgO-70% SiO₂ | .43 | 33.0 | 5.3 | .79 |
| Do | .60 | 44.0 | 7.5 | .86 |
| Do | .70 | 53.0 | 7.0 | .87 |

From the above it will be seen that maximum conversions are obtained with the higher density gels.

The following table shows the effect of activation temperature on catalyst activity of catalysts prepared as herein described containing 30% of MgO and 70% of 0.60 apparent density silica gel:

| Activating Temperature | 400° F. E. P. Gasoline | Gas L/100 Grams Liquid Product | Gas Density |
|---|---|---|---|
| 850° F | 37.5 | 5.9 | .76 |
| 1200° F | 44.0 | 7.5 | .86 |
| 1400° F | 41.0 | 5.8 | .88 |

*Example 7*

A batch of catalyst was prepared by intimately mixing magnesium carbonate, in the form of magnesite, with a silica hydrogel, the dry gel of which had an apparent density of .60, in such proportions that the resulting catalyst had a magnesium oxide content of about 30%. This product was then slowly dried and activated at 1250° F. for about 3 hours during which time the carbonate was decomposed to the oxide. This product when tested under the above conditions resulted in 41.0% conversion to 400° F. end point gasoline and liberated 10.9 liters of .61 density gas per 100 grams of liquid product obtained.

*Example 8*

Another batch of catalyst containing 30% MgO was prepared as previously described except that a gelatinous precipitate of silica was employed instead of silica hydrogel. This product when tested as previously described produced 36.0% gasoline conversion with the liberation of 4.7 liters of .76 gas per 100 grams of liquid product.

One of the outstanding advantages of silica-magnesia catalyst prepared as previously described is the high yield of gasoline and a low yield of gaseous hydrocarbons.

Having described the preferred embodiment of the invention, it will be understood that it embraces such other variations and modifications that come within the spirit and scope thereof.

What is desired to be protected by Letters Patent is:

1. The process of converting hydrocarbon oils wherein said oils are contacted at conversion temperatures with a catalyst consisting essentially of active magnesia and active silica containing more than 15% and less than 30% of magnesia prepared by intimately mixing finely divided magnesia with silica hydrogel and thereafter drying and igniting the resulting mixture.

2. The process of converting hydrocarbon oils wherein said oils are contacted at conversion temperatures with a catalyst consisting essentially of active magnesia and active silica containing about 20% of magnesia prepared by intimately mixing finely divided magnesia with silica hydrogel and thereafter drying and igniting the resulting mixture.

3. The process of converting hydrocarbon oils wherein said oils are contacted at conversion temperatures with a catalyst consisting essentially of active magnesia and active silica containing more than 15% and less than 30% magnesia prepared by kneading together finely divided magnesia and silica hydrogel, drying the resultant mixture at temperatures below 200°–250° F. and then slowly heating the mixture to a temperature of 800–1400° F. in order to further dry and activate the mixture.

4. The process as defined in claim 3 wherein the silica hydrogel utilized yields dried gels of apparent density between 0.4 and 0.75.

5. The process as defined in claim 3 wherein the catalyst contains about 20% of magnesia.

6. The process as defined in claim 3 wherein the silica hydrogel utilized yields dried gels of an apparent density between 0.4 and 0.75 and the catalyst contains about 20% of magnesia.

GERALD C. CONNOLLY.

REFERENCES CITED

The following references are of record in the file of this patent:

UNITED STATES PATENTS

| Number | Name | Date |
|---|---|---|
| 2,343,295 | Bailie et al. | Mar. 7, 1944 |

FOREIGN PATENTS

| Number | Country | Date |
|---|---|---|
| 504,614 | Great Britain | Apr. 24, 1939 |